(12) United States Patent
Bronstein et al.

(10) Patent No.: US 12,459,236 B2
(45) Date of Patent: Nov. 4, 2025

(54) GLAZING FOR HEAD-UP DISPLAY

(71) Applicant: CARLEX GLASS AMERICA, LLC, Nashville, TN (US)

(72) Inventors: Wladislaw Bronstein, Konz (DE); Olivier Farreyrol, Wasserbillig (LU); Markus Walter Pohlen, Mückeln (DE); Michael Bard, Wadern (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 18/571,577

(22) PCT Filed: Jun. 17, 2022

(86) PCT No.: PCT/US2022/034047
§ 371 (c)(1),
(2) Date: Dec. 18, 2023

(87) PCT Pub. No.: WO2022/266477
PCT Pub. Date: Dec. 22, 2022

(65) Prior Publication Data
US 2024/0278539 A1 Aug. 22, 2024

Related U.S. Application Data

(60) Provisional application No. 63/247,026, filed on Sep. 22, 2021, provisional application No. 63/211,736, filed on Jun. 17, 2021.

(51) Int. Cl.
*B32B 17/10* (2006.01)
*B60K 35/234* (2024.01)
*G02B 27/01* (2006.01)

(52) U.S. Cl.
CPC .. *B32B 17/10036* (2013.01); *B32B 17/10357* (2013.01); *B32B 17/10495* (2013.01); *B32B 17/10568* (2013.01); *B60K 35/234* (2024.01); *G02B 27/0101* (2013.01);
(Continued)

(58) Field of Classification Search
CPC ........ B32B 17/10036; B32B 17/10357; B32B 17/10495; B32B 17/10568; B32B 17/10174; B32B 17/10348; B32B 17/10458; B32B 2307/202; B32B 2307/41; B32B 2307/416; B32B 2605/006;
(Continued)

(56) References Cited

U.S. PATENT DOCUMENTS

2009/0295681 A1* 12/2009 Kaminski ......... B32B 17/10165 428/426
2020/0333593 A1* 10/2020 Bard ................ B32B 17/10036
2021/0316534 A1* 10/2021 Fischer .................. G02B 1/116

FOREIGN PATENT DOCUMENTS

JP H10096874 A * 5/1996
JP H1096874 A 4/1998

\* cited by examiner

*Primary Examiner* — Brent D Castiaux
(74) *Attorney, Agent, or Firm* — K&L Gates LLP; Shu Chen

(57) ABSTRACT

A laminated glazing according to this disclosure includes a first glass sheet having first and second opposing surfaces, a second glass sheet having third and fourth opposing surfaces, an interlayer positioned between the second surface of the first glass sheet and the third surface of the second glass sheet, a first opaque layer, and a first reflective layer on the second glass sheet in an area overlapping with the first opaque layer.

19 Claims, 5 Drawing Sheets

(52) U.S. Cl.
CPC ..... *B32B 2307/202* (2013.01); *B32B 2307/41* (2013.01); *B32B 2307/416* (2013.01)

(58) Field of Classification Search
CPC .............. B60K 35/234; G02B 27/0101; G02B 27/0018; G02B 27/01; H05B 3/86
See application file for complete search history.

GLAZING FOR HEAD-UP DISPLAY

CROSS REFERENCE TO RELATED APPLICATIONS

This application is a national phase entry of PCT/US2022/034047 filed Jun. 17, 2022, which claims priorities to U.S. Provisional Application No. 63/211,736, filed on Jun. 17, 2021, entitled "GLAZING FOR HEAD-UP DISPLAY" and U.S. Provisional Application No. 63/247,026, filed on Sep. 22, 2021, entitled "HEAD-UP DISPLAY GLAZING," the entire contents of which are incorporated by reference herein in their entirety.

TECHNICAL FIELD

The present disclosure is generally related to a glazing having a darkened area for a display area.

BACKGROUND

Head-up displays are used in automotive vehicles for providing an image or information to a driver without requiring the driver to look away from the windshield. Information may be projected onto the windshield in an area that can be seen without obstructing the view of the driver. Some information may require an improvement over existing constructions to improve the visibility of certain projected information.

SUMMARY OF THE DISCLOSURE

Disclosed herein is a laminated glazing, comprising a first glass sheet having first and second opposing surfaces; a second glass sheet having third and fourth opposing surfaces; an interlayer between the first glass sheet and the second glass sheet, wherein the interlayer is positioned between the second surface of the first glass sheet and the third surface of the second glass sheet; a first opaque layer; and a first reflective layer on the fourth surface of the second glass sheet, wherein the first reflective layer on the second glass sheet is in an area overlapping with the first opaque layer.

In some embodiments of this disclosure, the first reflective layer may be a reflective paint. The laminated glazing may further include a second opaque layer on the fourth surface of the second glass sheet. The reflective layer may be electrically conductive and electrically connected to a power source. The first reflective layer may have a highest visible light reflectivity at a light wavelength used in a projected light from a head-up display projector when installed in a vehicle. The first reflective layer may include a reflective coating applied to the second glass sheet or may include a reflective film adhered to the second glass sheet.

In some embodiments of this disclosure, a masking layer may be used over the first reflective layer. The masking layer may include a film adhered over the first reflective layer. A protective layer may be provided over the first reflective layer.

In some embodiments of this disclosure, the first reflective layer may provide a first display surface, such that the first opaque layer is a background for the first display surface, and the laminated glazing may further comprise a second display surface not aligned with the first opaque layer. The laminated glazing may include the interlayer in a wedge shape or may include a half wave plate between the first and second glass substrates. The laminated glazing may include a second reflective layer in the area of the second display.

In another aspect of the present disclosure, a head-up display system may comprise a laminated glazing as described above, and a projector for projecting first light toward the first reflective layer of the laminated glazing, wherein a first image is produced as a virtual image from a reflection of the first light at the first reflective layer.

In some embodiments of this disclosure, the first reflective layer may provide a first display surface, such that the first opaque layer is a background for the first display surface, and the head-up display system may include the laminated glazing further having a second display surface not aligned with the first opaque layer, and a projector may emit a second light to the second display surface, wherein a second image is produced as a virtual image from a reflection of the second light off the second display surface. The head-up display system may have the interlayer made in a wedge shape. The head-up display system may be formed with the laminated glazing having a second reflective layer between the first glass sheet and the second glass sheet, and the second light may be p-polarized light. The laminated glazing in the disclosed head-up display system may have a half wave plate between the first glass sheet and the second glass sheet, wherein the second light is s-polarized light or p-polarized light.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
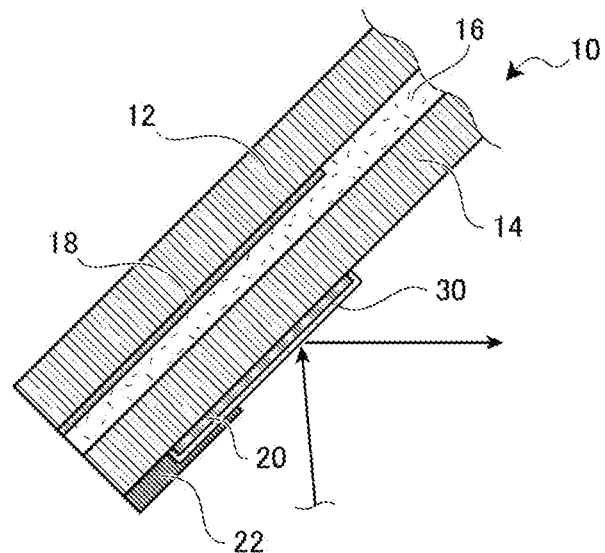
FIG. 1 illustrates a cross-section of a portion of a laminated glazing, according to an exemplary embodiment of the present disclosure.

In the following description, for purposes of explanation, specific details are set forth in order to promote a thorough understanding of one or more aspects of the disclosure. It may be evident in some or all instances, however, that any aspects described below can be practiced without adopting the specific design details described below.

A conventional laminated glazing may include a first glass sheet, an interlayer, and a second glass sheet laminated together. The glass sheets may be bent to a desired shape prior to lamination with an interlayer therebetween. Preferably, the glass sheets may be a soda-lime silica glass. Glass bending may preferably occur by heat treatment from 550° C. to 700° C., more preferably from 580° ° C. to 660° C. The interlayer may include an adhesive polymer sheet, which may include polyvinyl butyral (PVB) or ethylene vinyl acetate (EVA). An interlayer may include an ionomer sheet in some glazings. Such a laminated glazing may include a windshield. A typical windshield may include a laminated glazing having a first glass sheet and a second glass sheet. The first glass sheet may include a first surface opposite a second surface wherein the first surface faces a vehicle exterior when installed in a vehicle. The second glass sheet may include a third surface opposite a fourth surface wherein the fourth surface faces a vehicle interior when installed in a vehicle. The second surface of the first glass sheet may face the third surface of the second glass sheet in a laminated glazing. The mounted angle of the windshield, measured as the angle included between on the one hand a vertical line and on the other hand a straight line passing through the top and bottom center edges of the windscreen, may be 55 to 80 degrees, preferably 60 to 75 degrees, more preferably 60 to 70 degrees.

A windshield herein may include an area for projecting an image which may provide information to an observer, such as a driver or other vehicle occupant. Such information may include that which is typically provided in a vehicle dash, such as an odometer and speedometer. This type of information may be needed no matter external conditions which may otherwise affect a head-up display. For example, the reflections of headlights of oncoming traffic may hinder visibility of a head-up display. To increase visibility of the reflections, it may be desirable to provide an opaque or darkened layer behind the reflective layer, when viewed from a vehicle interior. As such, an opaque layer may be provided on or in the windshield to the outside of the reflective layer. The opaque layer may be black and may provide a dark background for the reflection and increase visibility of the head-up display by providing a higher image contrast and blocking external light. The opaque layer may block light from the vehicle exterior such that light and weather conditions may not affect the image projected to the glazing. The opaque layer may further eliminate another reflection from the first surface of the first glass sheet. The glazing may further include an opaque layer at an outer periphery of the glazing. The opaque layer aligned with the reflective layer may be a part of or separate from an outer periphery opaque layer of the glazing. A projector may emit a first light towards the reflective layer. The light may reflect off the reflective layer and provide a first display for an observer in a vehicle.

The opaque layer may include material known in the art, such as an enamel paint which may be screen printed onto the glass sheet or a colored film which may include a polymer film. The opaque layer may include an extended or wide portion for aligning with the reflective layer to provide a head-up display surface. An opaque layer may be printed onto a glass surface, an interlayer, or a laminated film and may include an enamel or organic print. The opaque layer may extend up from a bottom of the glazing but may extend upwards through less than half of the laminated glazing. Preferably, the opaque layer may extend upwards through less than a third of the laminated glazing. In some embodiments, the opaque layer may extend across the entire glazing width. In some embodiments, the opaque layer may have a total light transmission of 50% or less, 40% or less, or 10% or less. The opaque layer may preferably have a total light transmittance of 0% to 5%, more preferably 0% to 1%, even more preferably 0 to 0.2%. The total light transmittance may be determined according to ISO 9050:2003, "Glass in building—Determination of light transmittance, solar direct transmittance, total solar energy transmittance, ultraviolet transmittance and related glazing factors". To measure light transmission across a wavelength spectrum or at a particular wavelength, including the visible light wavelength range, any suitable equipment complying with the ISO 9050:2003 may be used, such as a UV-Vis Spectrophotometer (e.g., U4000, Hitachi High-Tech Science).

In some embodiments, the opaque layer may be a colored resin film or a colored coating. The colored resin film may be a resin film containing pigments, dye, or any other coloring materials and may be inserted between the first and second glass sheets, preferably between the first glass sheet and an interlayer. The colored coating may be an organic or inorganic coating containing pigments, dye, or any other coloring materials on the first glass sheet, the second glass sheet, the interlayer, the reflective layer, or other components in the laminated glazing. A part of the interlayer may be colored as the opaque layer. The colored part of the interlayer may contain pigments, dye, or any other coloring materials, or the colored part of the interlayer may be coated with a paint containing pigments, dye, or any other coloring materials.

The reflection of a projected display, particularly in a lower area of a windshield, may be improved by the use of a reflective layer. The reflective layer may include a paint, a coating, or a film. A light reflective layer may be suitable to provide a quality reflected image for an observer. A reflective layer may increase the reflection and increase head-up display visibility. The reflective layer may preferably reflect p-polarized light. The reflective layer may have a p-polarized reflectivity of a projected light from 4% to 50%, preferably 10% to 35%, more preferably 20% to 30%. The reflectivity may be determined according to ISO 9050:2003 "Glass in building—Determination of light transmittance, solar direct transmittance, total solar energy transmittance, ultraviolet transmittance and related glazing factors". The reflective layer may have a highest reflectivity at a light wavelength used in a projected light from a head-up display projector when installed in a vehicle. With reflection angles near the Brewster-angle, the reflection of p-polarized light from the glass surface is low which provides a head-up display image of weak intensity when used with p-polarized sunglasses. A reflective layer may increase the p-polarized reflection and increase head-up display visibility. The reflective layer in this disclosure may have a smooth surface with a roughness Ra of less than 500 nm, preferably less than 200 nm, more preferably less than 100 nm. The reflective layer may have a low reflection haze value less than 10%, preferably less than 5%, more preferably less than 3%. The roughness Ra may be determined according to ISO 4287: 1997, "Geometrical Product Specifications (GPS)—Surface texture: Profile method—Terms, definitions and surface texture parameters". Reflection haze may be determined according to ISO 13803:2014, "Paint and varnishes—Determination of haze on paint films at 20°".

The reflective layer may preferably have low waviness such that waviness of the reflected HUD image is below 0.8 mrad, more preferably <0.5 mrad, and even more preferably <0.3 mrad. The waviness may be determined in a reflected image setup as defined in ISO 16610:2011 where horizontal and vertically projected lines should be evaluated to angular deviations.

Contrast of the reflected image off the reflective layer may be determined as defined in PCT/US2021/051968. At 30 line pairs, the contrast may preferably be at least 30%, more preferably at least 50% and even more preferably at least 70%.

In some embodiments, the reflective layer may include a reflective paint having a high reflectivity in a visible light range. A reflective paint may be printed onto a glass surface and may include, for example a LustReflex paint sold by Ferro. The reflective paint may still be transparent such that some light does transmit through the paint layer. Paints may have various colors, such as silver or gold and may be selected for desired light to be reflected and/or desired appearance of the reflective layer. The paint may preferably be chemically durable and has preferably a high scratch resistance. The reflective paint may be printed by processes known in the art, including screen printing. Screen printing may be a preferable method of applying the reflective paint over other methods of applying materials, including vapor deposition coating methods. The glass surface for printing the reflective paint may be a smooth surface such that that paint may be smooth and provide a good reflective image quality.

Other reflective materials may be used in some embodiments. For example, a reflective layer may include a coating or a film which may be adhered to the glass. In some embodiments, the reflective layer may include a stack of materials, which may include, for example, thin films or coating layers. Where the image to be reflected is a p-polarized light, the p-polarized light reflective layers may include a film having a base film and a reflective layer thereon or may include a reflective layer without a base film. A coating may be directly applied to a glass surface or to a film to be adhered to the glass sheet.

Some reflective layers used in glazings as described herein may further be electrically conductive. Where a reflective layer is electrically conductive, it may be connected to a power source, such as through a busbar and connector on the reflective layer. The layer may heat when an electrical current is applied thereto and may, for example, serve to de-fog the display area of the reflective layer. The reflective layer may further be heated in an area of a wiper park at the bottom of the windshield where a wiper may sit when not in use.

The reflective layer 20 may be applied to a glazing surface facing a vehicle interior (namely, the fourth surface of the second glass sheet) as shown in FIGS. 1 to 13. The reflective layer 20 may include a coating applied to the glass surface or a film adhered to the glass surface. Where the reflective layer 20 is adhered, an adhesive may have suitable optical properties so as to allow for a suitable reflection of the first display. In some embodiments, the reflective layer 20 may be provided in only a portion aligning with the opaque layer 18. Limiting the area of the reflective layer 20 may decrease costs and alleviate difficulties that may arise when laminating a film or otherwise placing the reflective layer. A reflective layer may be provided in a size and position such that it does not extend past the opaque layer. In some embodiments the opaque layer may extend past the edges of the reflective layer.

Figure 3:
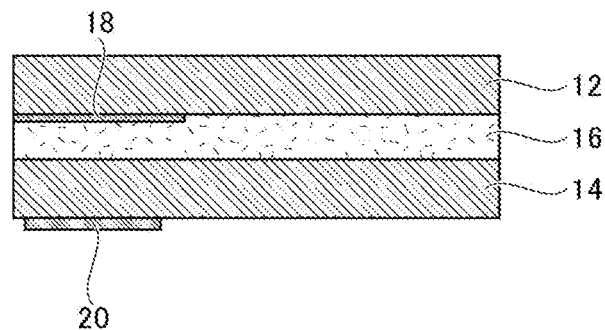
FIG. 3 illustrates a cross-section of a portion of a laminated glazing, according to an exemplary embodiment of the present disclosure.

FIG. 3 shows a cross-sectional structure of a laminated glazing 10 according to this disclosure. The laminated glazing 10 may be used as a windshield of an automobile and may include a first glass sheet 12 and a second glass sheet 14. An interlayer 16 may be provided between the first and second glass sheets 12, 14. A first opaque layer 18 may be arranged in a lower area (left side in FIG. 3) on the second surface of the first glass sheet 12 or the exterior surface of the interlayer 16. When installed in a vehicle, the first opaque layer 18 may be below the glazing opening through which a driver observes the surrounding environment. The first opaque layer 18 may be formed of an enamel paint which may be screen printed onto the first glass sheet 12. The first opaque layer 18 may be black and may provide a dark background for the reflection and increase visibility of the head-up display by providing a higher image contrast and blocking external light. A first reflective layer 20 may be arranged on the fourth surface of the second glass sheet 14 to provide a quality reflected image for an observer. A projector, not shown, as a part of a head-up display system, may preferably emit unpolarized or p-polarized light, which may be reflected off the surface of the first reflective layer 20. The first reflective layer 20 may be made of a coating or paint applied to the glass surface or a film adhered to the glass surface. The first reflective layer 20 on the second glass sheet 14 may be in an area overlapping with the first opaque layer 18. The term "overlapping" is defined from observer's eye point.

Figure 2:
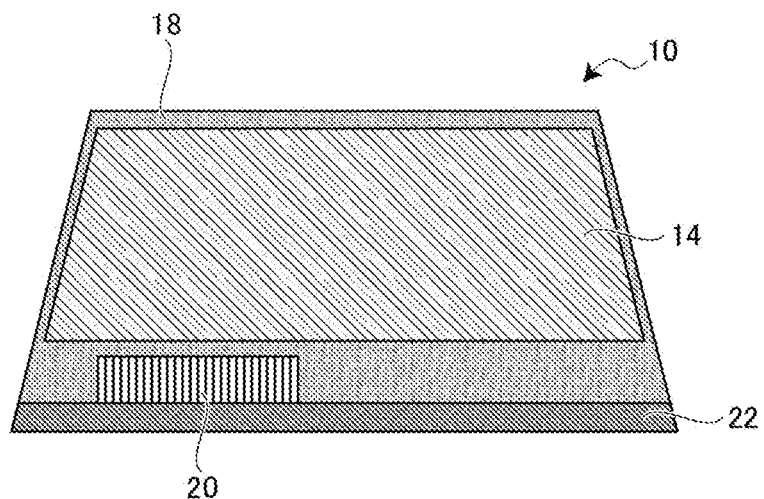
FIG. 2 illustrates a layout of a laminated glazing, according to an exemplary embodiment of the present disclosure.

FIG. 1 and FIG. 2 show detail of a laminated glazing according to this disclosure. First and second glass sheets 12, 14 may be provided with an interlayer 16 therebetween. A first opaque layer 18 may be provided as a background of the first reflective layer 20 for blocking light coming from the vehicle exterior. In some embodiments, the first reflective layer 20 may be in a rectangular shape located on a lower left side or lower right side of the glazing 10.

A windshield may further include a second opaque layer 22 in some embodiments of the present disclosure as shown in FIGS. 1 and 2. The second opaque layer 22 may be provided on a fourth surface of the second glass sheet 14. The second opaque layer 22 may be the same material or different from the first opaque layer 18 and may partially overlap with the first reflective layer 20 to cover the lower edge of the first reflective layer 20. FIG. 2 illustrates an example embodiment from the fourth surface of the second glass sheet 14 which faces a vehicle interior when installed in a vehicle.

The first reflective layer 20 facing a vehicle interior may further have a protective layer 30 thereover as shown in FIG. 1. For simplicity, the protective layer 30 is not shown in FIG. 2. The protective layer may provide one or more of the functions of scratch resistance, hard-coating, easy-to-clean, anti-fingerprint, and anti-fogging. The protective layer 30 may include a coating, such as a hard coating, or a film which may provide mechanical and/or chemical protection of the reflective layer surface. For example, the protective layer 30 may prevent scratches or other abrasions to the reflective layer 20. The protective layer 30 may provide long-term durability to the reflective layer 20 and ensure suitable displays which may not be interrupted by scratches or other imperfections in the reflective layer surface. The protective layer 30 may be applied over the first reflective layer 20 with an adhesive or coated or painted onto the first reflective layer 20. A protective layer coating may include a hard coating, such as an acrylic. The protective layer 30 may have a suitable optical appearance to be applied to a glazing. The protective layer 30 may have flexibility to conform to the shape of the glazing.

The protective layer 30 may have physical and chemical protective qualities. Particularly, the protective layer 30 may have a haze value of less than 2% after the Taber test, as described in ECE R43 (updated May 2019). Further, the protective layer 30 may have a chemical resistance which may pass the chemical resistance test as defined in ECE R43 (updated May 2019).

Figure 4:
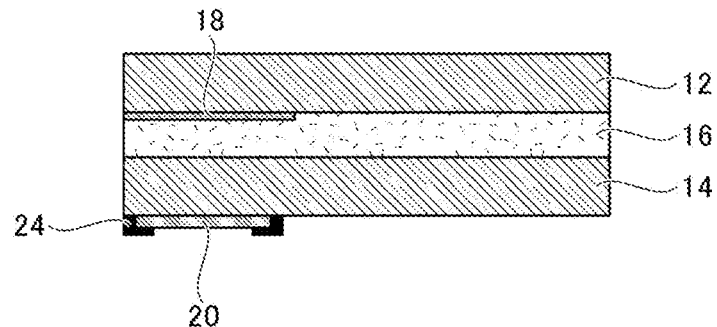
FIG. 4 illustrates a cross-section of a portion of a laminated glazing, according to an exemplary embodiment of the present disclosure.

The glazing having a reflective layer 20 applied thereto may further include a masking layer 24, as shown in FIG. 4. The masking layer 24 may be applied over the first reflective layer 20 to hide any edges of the first reflective layer 20 from a view of the vehicle interior. The masking layer 24 may leave a central portion of the first reflective layer 20 open to serve as the first display. The masking layer 24 may include an opaque material, such as a printed film or a colored film, which may be adhered over the first reflective layer 20. The masking layer 24 may be the same or different color from the opaque layer 18. Preferably, the masking layer 24 may be the same color as the opaque layer 18.

Figure 5:
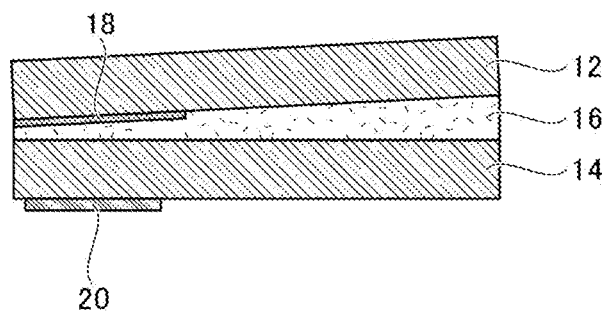
FIG. 5 illustrates a cross-section of a portion of a laminated glazing, according to an exemplary embodiment of the present disclosure.
Figure 6:
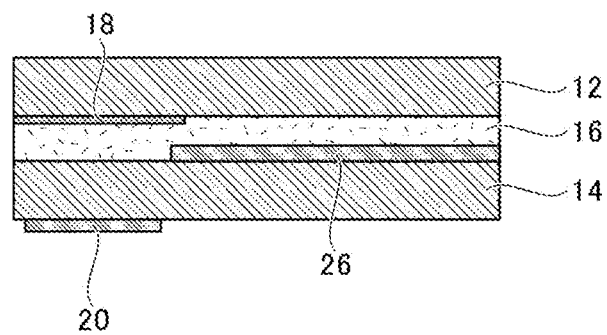
FIG. 6 illustrates a cross-section of a portion of a laminated glazing, according to an exemplary embodiment of the present disclosure.
Figure 7:
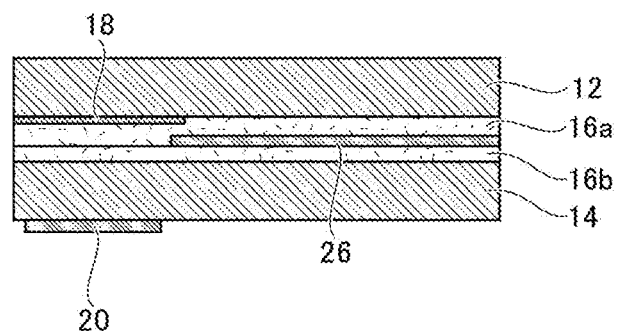
FIG. 7 illustrates a cross-section of a portion of a laminated glazing, according to an exemplary embodiment of the present disclosure.
Figure 8:
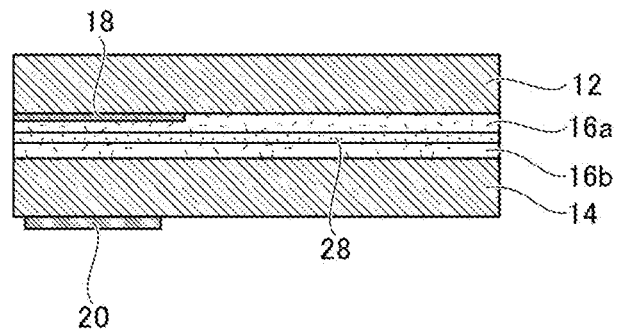
FIG. 8 illustrates a cross-section of a portion of a laminated glazing, according to an exemplary embodiment of the present disclosure.
Figure 9:
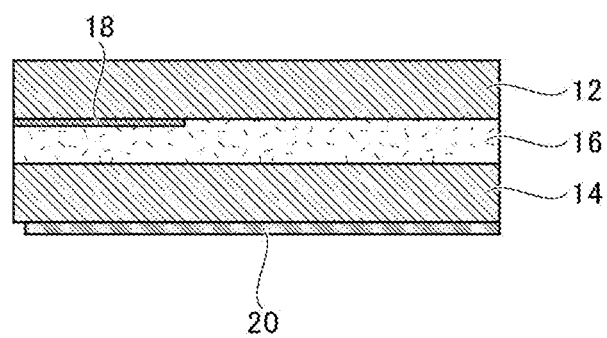
FIG. 9 illustrates a cross-section of a portion of a laminated glazing, according to an exemplary embodiment of the present disclosure.

A laminated glazing 10 may be constructed to provide a second display surface in a main area of the glazing 10, which may be above the first display surface having an opaque background. For example, such a construction may include a wedge-shaped interlayer as shown in FIG. 5, a reflective layer as shown in FIGS. 6, 7, and 9, or a half wave plate as shown in FIG. 8 for providing the second display. A wedge-shaped interlayer 16 may adjust the direction of a projected light to align reflections and prevent a second, off-set image for an observer. A reflective layer may be the same or different from the reflective layer 20 used for the first display.

Figure 10:
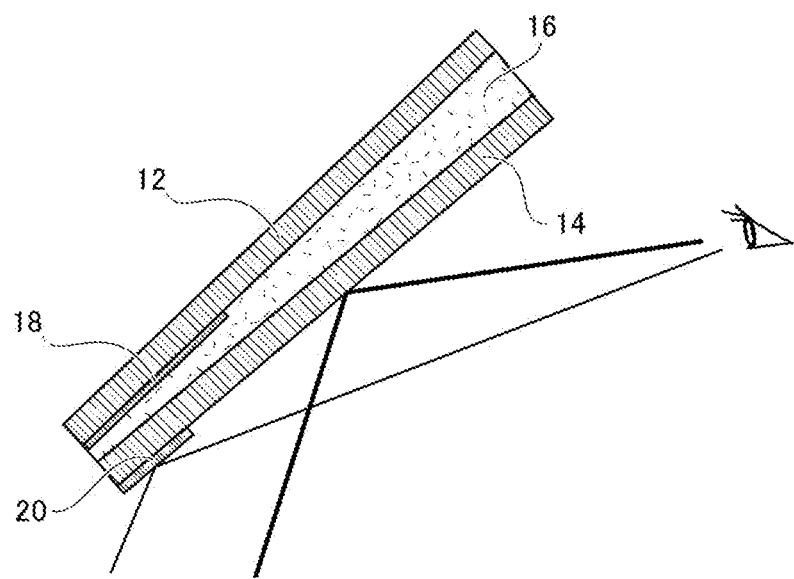
FIG. 10 illustrates light paths of the laminated glazing shown in FIG. 5.

FIG. 10 illustrates light paths of the laminated glazing having the wedge-shaped interlayer 16. A first light may reflect off the surface of the first reflective layer 20 and show a first image as a virtual image in an area of a first display surface. A second light may reflect off the surface of the second glass sheet 14 and provide a second image as a virtual image in an area of a second display surface. The observer in this vehicle may recognize the first image formed from the first light reflected at the surface of the first reflective layer 20, and simultaneously the second image formed from the second light reflected at the surface of the second glass sheet 14. Because the laminated glazing is wedge-shaped due to the wedge-shape of the interlayer 16, the reflected image from the first surface of the first glass sheet 12 (not shown in FIG. 10) is close to or overlaps the reflected image from the fourth surface of the second glass sheet 14 from the observer's viewpoint and double images or ghost images of the second image are diminished so that the observer is able to see the second image clearly. At the same time, the observer may be able to see the first image clearly in front of the first opaque layer 18.

A second reflective layer 26 for the second display may be laminated within the glass sheets 12, 14 or applied to a glass surface, as shown in FIGS. 6, 7, and 9. Where the second reflective layer 26 is applied to the glazing surface, the second reflective layer 26 may be continuous with the first reflective layer 20 and may cover most of the fourth surface of the second glass sheet 14 as shown in FIG. 9. A reflective layer without a base film may be adhered or coated to the third glass surface of the second glass sheet 14 or to a surface of an interlayer 16 in the glazing. Where a laminated film provides the second reflective layer 26, the film may be laminated between two interlayer sheets or layers 16a, 16b.

In some embodiments, where the second reflective layer 26 is provided as a film, the opaque layer 18 may be provided as a print on the film, where the opaque layer 18 may be between the reflective material of the film and the second glass sheet 14. In some embodiments, a second reflective layer 26 may extend across a majority of the glazing, however, the opaque layer 18 may be included in only a portion of the glazing. Where the second reflective layer 26 extending across a majority of the glazing includes a base film and opaque layer 18, the opaque layer 18 may be provided on only a portion of the base film. Particularly, the opaque layer 18 may be provided in a lower portion of the base film to provide a dark background for images projected to a lower windshield area at the first reflective layer 20.

FIG. 6 illustrates a structure having a second reflective layer 26. The second reflective layer 26 may be provided between the interlayer 16 and the third surface of the second glass sheet 14. The second reflective layer 26 may be adhered or coated to the third glass surface of the second glass sheet 14 or to a surface of the interlayer 16. The second reflective layer 26 may extend across a majority of the laminated glazing. The first opaque layer 18 may be provided on the second surface of the first glass sheet 12 at a lower portion of the glass sheet to provide a dark background for the image reflecting at the surface of the first reflective layer 20. The second reflective layer 26 may be used for a second image which may include information projected from a projector, not shown, of the vehicle.

FIG. 7 illustrates another structure having a second reflective layer 26. In FIG. 7, the second reflective layer 26 may be provided between a first interlayer 16a and a second interlayer 16b. One of the first interlayer 16a and the second interlayer 16b may be a thin adhesive coating which has a thickness of 1 to 50 micrometers, preferably 1 to 25 micrometers, more preferably 4 to 15 micrometers. The second reflective layer 26 may be provided either on the first interlayer 16a or on the second interlayer 16b. The second reflective layer 26 may extend across a majority of the laminated glazing.

Figure 11:
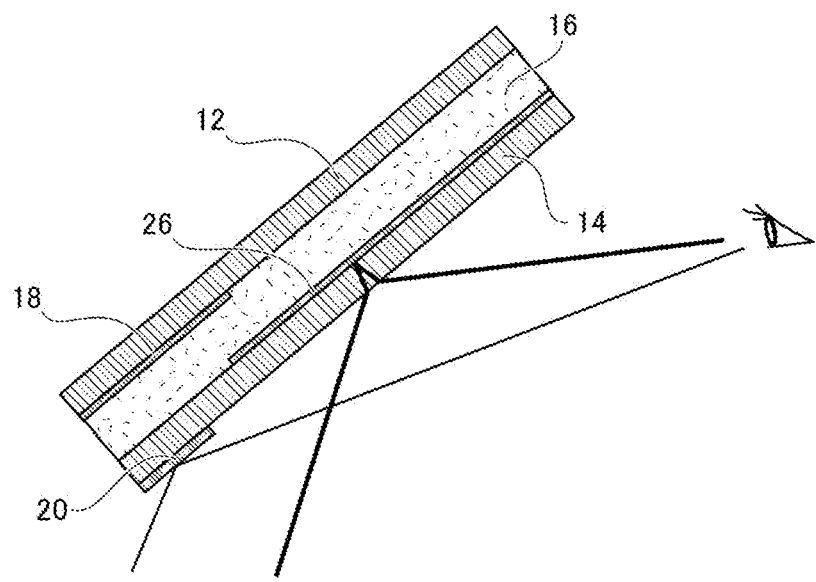
FIG. 11 illustrates light paths of the laminated glazing shown in FIG. 7.

FIG. 11 illustrates light paths of the laminated glazing shown in FIG. 7. The first light projected from a projector, not shown, may be directed to the first reflective layer 20 and may be reflected therefrom toward the eyes of the observer. The reflection off the surface of the first reflective layer 20 may be done with any angle as far as outgoing to the observer's eyes. Where the second light is p-polarized light and is projected at the Brewster's angle, no reflection may occur off the surface of the second glass sheet 14. The second light may transmit through the second glass sheet 14 and reflect off the surface of the second reflective layer 26. The light reflected off the second reflective layer 26 may be visible as a second image of the second display as a virtual image.

FIG. 8 illustrates yet another structure having a half wave plate 28 in the interlayer 16a, 16b. As shown in FIG. 8, a half wave plate 28 may be laminated between the first interlayer 16a and the second interlayer 16b. This multilayer structure may be sandwiched by the first glass sheet 12 and the second glass sheet 14. The first opaque layer 18 may be provided on a lower end of the windshield between the first glass sheet 12 and the first interlayer 16a. The first reflective layer 20 may also be provided on the fourth surface of the second glass sheet 14. The observer may see the first images as virtual images from the reflection at the first reflective layer 20 and the second images as virtual images in the area with the half wave plate 28.

Figure 12:
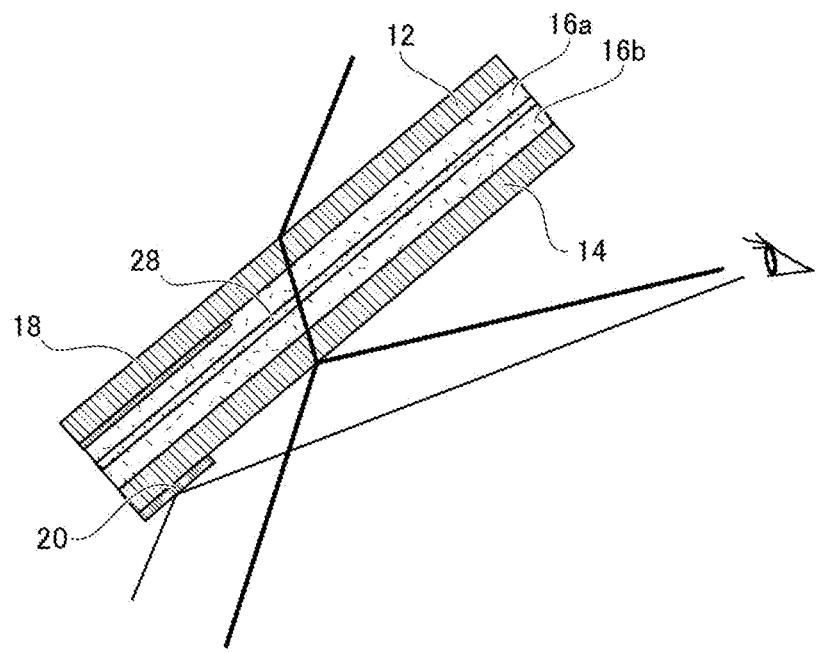
FIG. 12 illustrates light paths of the laminated glazing shown in FIG. 8.
Figure 13:
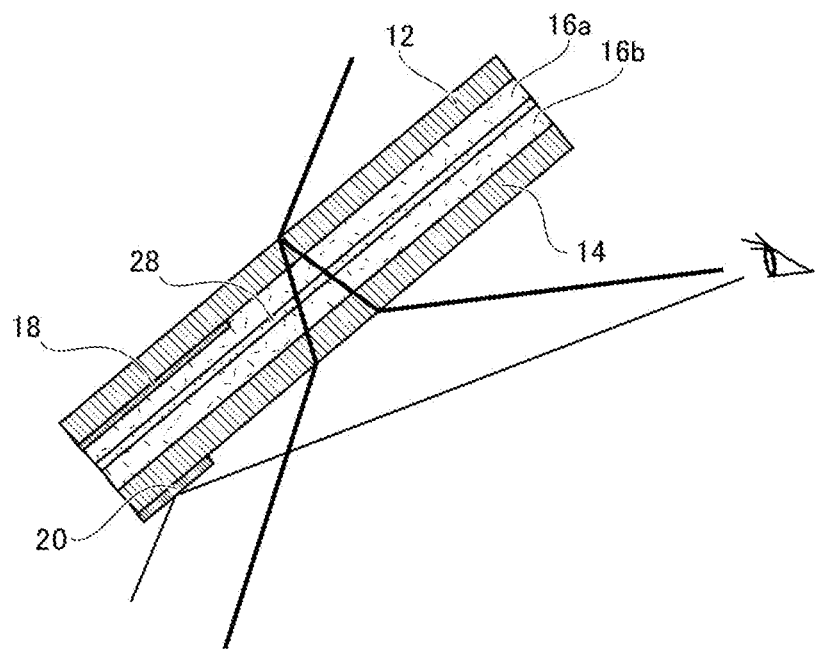
FIG. 13 illustrates alternative light paths of the laminated glazing shown in FIG. 8.

With this structure, the head-up display system may operate as shown in FIG. 12 and FIG. 13. FIG. 12 and FIG. 13 illustrate light paths of the laminated glazing shown in FIG. 8. The first light projected from a projector, not shown, is directed to the first reflective layer 20 and is reflected toward the eyes of the observer. The first opaque layer 18 serves as a background for blocking unnecessary light noise.

FIG. 12 illustrates a second light being s-polarized light. Where the s-polarized light enters the second glass sheet 14 at the Brewster's angle, a part of the second light may reflect off the surface and go to the observer's eyes as the second image, and another part of the second light may enter into the second glass sheet 14. The s-polarized second light may pass through the half wave plate 28 and is converted into p-polarized light. The p-polarized second light may not reflect off the first surface of the first glass sheet 12 and may be transmitted as p-polarized light through the first glass sheet 12 to the exterior of the vehicle, because p-polarized light does not reflect at the Brewster's angle.

FIG. 13 illustrates the second light being p-polarized light. Where the projector of the head-up display system emits p-polarized light, the p-polarized light is directed to the second glass sheet 14. At the surface of the second glass sheet 14, p-polarized light does not reflect at the Brewster's angle and transmits through the second glass sheet 14. The p-polarized second light may further pass through the half wave plate and convert into s-polarized light. A part of the s-polarized second light may reflect off the first surface of the first glass sheet 12. The s-polarized second light further passes through the half wave plate again and is converted into the p-polarized light. The p-polarized second light goes to the observer's eyes as the second image. The second image can be seen by the observer wearing p-polarized sunglasses.

The first light and the second light may be emitted by the same projector or different projectors.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated glazing, comprising:
 a first glass sheet having first and second opposing surfaces;
 a second glass sheet having third and fourth opposing surfaces;
 an interlayer between the first glass sheet and the second glass sheet, wherein the interlayer is positioned between the second surface of the first glass sheet and the third surface of the second glass sheet;
 a first opaque layer; and
 a first reflective layer applied on the fourth surface of the second glass sheet in an area overlapping with the first opaque layer.

2. The laminated glazing according to claim 1, further comprising a second opaque layer on the fourth surface of the second glass sheet.

3. The laminated glazing according to claim 1, wherein the first reflective layer is electrically conductive and electrically connected to a power source.

4. The laminated glazing according to claim 1, wherein the first reflective layer has a highest visible light reflectivity at a light wavelength used in a projected light from a head-up display projector when installed in a vehicle.

5. The laminated glazing according to claim 1, wherein the first reflective layer is a reflective paint.

6. The laminated glazing according to claim 1, wherein the first reflective layer includes a reflective coating applied to the second glass sheet.

7. The laminated glazing according to claim 1, wherein the first reflective layer includes a reflective film adhered to the second glass sheet.

8. The laminated glazing according to claim 1, further comprising a masking layer over the first reflective layer.

9. The laminated glazing according to claim 8, wherein the masking layer includes a film adhered over the first reflective layer.

10. The laminated glazing according to claim 1, further comprising a protective layer over the first reflective layer.

11. The laminated glazing according to claim 1, wherein the first reflective layer provides a first display surface, such that the first opaque layer is a background for the first display surface, and
 the laminated glazing further comprises a second display surface not aligned with the first opaque layer.

12. The laminated glazing according to claim 11, wherein the interlayer has a wedge shape.

13. The laminated glazing according to claim 11, further comprising a second reflective layer in the area of the second display.

14. The laminated glazing according to claim 11, further comprising a half wave plate between the first glass sheet and the second glass sheet.

15. A head-up display system, comprising:
 a laminated glazing, comprising:
  a first glass sheet having first and second opposing surfaces,
  a second glass sheet having third and fourth opposing surfaces,
  an interlayer between the first glass sheet and the second glass sheet, wherein the interlayer is positioned between the second surface of the first glass sheet and the third surface of the second glass sheet,
  a first opaque layer, and
  a first reflective layer applied on the fourth surface of the second glass sheet in an area overlapping with the first opaque layer; and
 a first projector for projecting first light toward the first reflective layer of the laminated glazing, wherein a first image is produced as a virtual image from a reflection of the first light off the first reflective layer.

16. The head-up display system according to claim 15, wherein the first reflective layer provides a first display surface, such that the first opaque layer is a background for the first display surface, and the laminated glazing further comprises a second display surface not aligned with the first opaque layer, and the first projector or a second projector emits a second light to the second display surface, wherein a second image is produced as a virtual image from a reflection of the second light off the second display surface.

17. The head-up display system according to claim 16, wherein the interlayer has a wedge shape.

18. The head-up display system according to claim 16, wherein the laminated glazing has a second reflective layer between the first glass sheet and the second glass sheet, and the second light is p-polarized light.

19. The head-up display system according to claim 16, wherein the laminated glazing has a half wave plate between the first glass sheet and the second glass sheet, and the second light is s-polarized light or p-polarized light.

* * * * *